US006843353B2

United States Patent
Majewski

(10) Patent No.: US 6,843,353 B2
(45) Date of Patent: Jan. 18, 2005

(54) ELECTRO-MAGNETIC CLUTCH HAVING AXIALLY MOVING COIL

(75) Inventor: Jan Majewski, Thornhill (CA)

(73) Assignee: Intier Automotive Closures Inc., Newmarket (CA)

( * ) Notice: Subject to any disclaimer, the term of this patent is extended or adjusted under 35 U.S.C. 154(b) by 0 days.

(21) Appl. No.: 10/450,982

(22) PCT Filed: Dec. 18, 2001

(86) PCT No.: PCT/CA01/01808

§ 371 (c)(1),
(2), (4) Date: Jun. 18, 2003

(87) PCT Pub. No.: WO02/50445

PCT Pub. Date: Jun. 27, 2002

(65) Prior Publication Data

US 2004/0055848 A1 Mar. 25, 2004

Related U.S. Application Data

(60) Provisional application No. 60/257,342, filed on Dec. 20, 2000.

(51) Int. Cl.⁷ .............................................. F16D 27/118
(52) U.S. Cl. ................... 192/84.92; 192/84.93; 335/298
(58) Field of Search .......................... 192/84.92, 84.9, 192/84.93; 335/219, 250, 298

(56) References Cited

U.S. PATENT DOCUMENTS 2,584,116 A * 2/1952 Duyck ..................... 192/84.81
2,969,134 A * 1/1961 Wiedmann et al. ...... 192/84.92
3,190,420 A   6/1965 Kampf
4,344,056 A * 8/1982 Kroeger et al. ............. 335/219
6,237,737 B1 * 5/2001 Jorgensen et al. ....... 192/84.92

FOREIGN PATENT DOCUMENTS

| FR | 590 041 | 12/1924 |
|---|---|---|
| FR | 1 240 468 | 9/1960 |
| FR | 2 609 512 | 1/1988 |
| GB | 1 602 627 | 4/1978 |

* cited by examiner

Primary Examiner—Rodney H. Bonck
(74) Attorney, Agent, or Firm—Clark Hill PLC

(57) ABSTRACT

An electromagnetic clutch assembly (10) has a housing (12, 14) and shaft (16) rotatably supported by the housing. At least one of the shaft extends out of the housing. A clutch plate (22) is mounted on the shaft (16) for rotation therewith. An armature plate (20) is mounted in the housing (12, 14). A gear (24) is rotatable and slidably mounted on the shaft (26). A spring assembly (88, 89) extends between the clutch plate (22) and the gear (24) to bias the gear (24) out of engagement with the clutch plate (22). A coil assembly (18) is mounted on the shaft (16) for sliding movement therealong. The coil assembly (18) engages the gear (24). Energizing the coil assembly moves the coil assembly (18) into engagement with the armature plate (20) and responsively effects movement of the gear (24) into engagement with the clutch plate (22), coupling the gear (24) and the clutch plate (22). De-energizing the coil assembly (18) responsively enables the spring assembly (88, 89) to effects movement of the gear (24) out of engagement with the clutch plate (22), de-coupling (24) and the clutch plate (22).

14 Claims, 2 Drawing Sheets

ELECTRO-MAGNETIC CLUTCH HAVING AXIALLY MOVING COIL

This application was filed under 35 USC 371 based on International Application Number PCT/CA01/01808, filed Dec. 18, 2001, which claims the benefit under 35 USC 119(e) of U.S. provisional application No. 60/257,342, filed Dec. 20, 2000.

FIELD OF INVENTION

This invention relates to an electromagnetic clutch. In particular, this invention relates to an improved electromagnetic clutch having a moving coil that improves the magnetic efficiency of the clutch.

BACKGROUND OF THE INVENTION

In WO 00/33445, a power actuator having an electromagnetic clutch assembly is described. This particular assembly has applications in releasing and cinching power latches for liftgates and power sliding doors found on minivans. Although the electromagnetic clutch improves the selective power engagement between the motor and the door latch, even greater improvements in efficiency are available.

SUMMARY OF INVENTION

The disadvantages of the prior art may be overcome by providing an electromagnetic clutch assembly having a moving coil.

According to one aspect of the invention, there is provided an electromagnetic clutch assembly having a housing and a shaft rotatably supported by the housing. At least one end of the shaft extends out of the housing. A clutch plate is mounted on the shaft for rotation therewith. An armature plate is mounted in the housing. A gear is rotatable and slidably mounted on the shaft. A spring extends between the clutch plate and the gear to bias the gear out of engagement with the clutch plate. A coil assembly is mounted on the shaft for sliding movement therealong. The coil assembly engages the gear. Energizing the coil assembly moves the coil assembly into engagement with the armature plate and responsively effects movement of the gear into engagement with the clutch plate, coupling the gear and the clutch plate. De-energizing the coil assembly responsively enables the spring to effect movement of the gear out of engagement with the clutch plate, de-coupling the gear and the clutch plate.

DESCRIPTION OF THE DRAWINGS

In drawings which illustrate embodiments of the preferred embodiment of the present invention.

DESCRIPTION OF THE PREFERRED EMBODIMENT OF THE INVENTION

Figure 1:
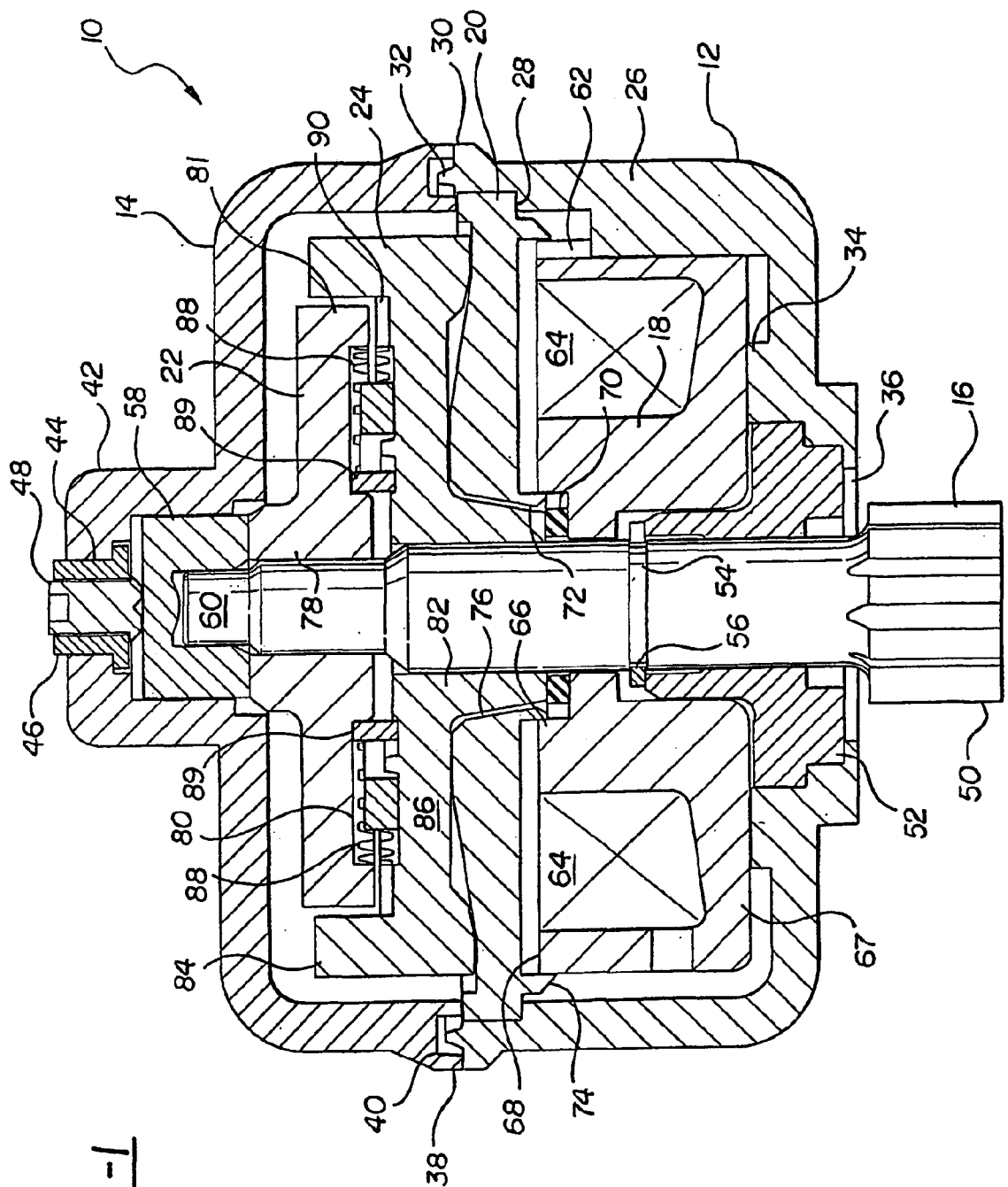
FIG. 1 is a cross-sectional view of the electromagnetic clutch assembly of the present invention.

Referring to FIG. 1, there is illustrated an electromagnetic clutch assembly 10 of the present invention. The clutch assembly generally comprises a housing, including a base 12 and a cover 14, an output shaft 16, a coil assembly 18, an armature plate 20, a clutch plate 22 and an input gear 24.

The base 12 of the housing is cup-shaped. The inner wall of the base 12 has a key 26 that extends radially. The inner wall has a shoulder 28 extending about the circumferential extent of the base 12 and spaced axially from the lip 30. Lip 30 has an axially extending protuberance 32. The bottom of base 12 has an axially extending annular stop 34 which preferably extends about a stepped aperture 36.

The cover 14 of the housing is also cup-shaped and sized to complementarily fit with base 12. The lip 38 of cover 14 has a circumferentially extending groove that is sized to receive the protuberance 32 of base 12 to seal and secure the base 12 and cover 14 together. Cover 14 has an axially extending boss 42 having a central aperture 44. A sleeve 46 is fitted within the aperture 44. Set screw 48 threadingly engages the sleeve 46 for travel in the axial direction.

Output shaft 16 has a gear 50 at one end and D-type flats at an opposite end enabling torque transfer. Adjacent the gear 50 and mounted on the shaft 16 is a bearing collar 52. Bearing collar 52 complementarily fits within the bottom of base 12 in the stepped aperture 36. Bearing collar 52 journal mounts one end of the shaft 16. Shaft 16 has a groove 54 that receives collet or retaining ring 56 which positions the gear shaft 16 in the bearing 52. A bearing cap 58 is sized to slidingly fit within the inner diameter of boss 42. Bearing cap has an axial recess for receiving end 60 of shaft 16 and supporting the shaft 16 for rotation.

Coil assembly 18 is generally doughnut shaped and comprises a core and winding. Coil assembly 18 has a central aperture that is sized to slidingly fit along shaft 16. Coil assembly 18 has an outer diameter sized to fit within and spaced from the inner wall diameter of base 12. A keyway 62 engages with the key 26 of base 12 to limit the movement of the coil assembly 18 to an axial reciprocating movement. The core of the coil assembly 18 has an annular groove 64 that is sized and positioned such that inner surface 66 has the same surface area as outer surface 68. Groove 64 receives an electromagnetic coil. Coil assembly 18 has an axial recess that receives ring bearing 70. The outer diameter of ring bearing 70 is less than the inner diameter of the axial recess. Preferably, the base 67 of the coil assembly 18 has a tapered thickness that decreases as the radius increases.

Armature plate 20 is a circular disc having an inner flange 72 and an outer flange 74 that the inner periphery and outer periphery of the coil assembly slide relative thereto. The inner flange 72 and the outer flange 74 have a radial clearance with the inner and outer peripheries of the coil assembly 18, respectively, in the order of about 0.05 to 0.2 mm. Flanges 72 and 74 have an axial length greater than the sliding distance of the input gear 24 between engaged and disengaged positions. Flanges 72 and 74 increase or amplify armature plate 20 to coil assembly 18 pull force.

Armature plate 20 has a central tapered bore 76. The outer periphery of the armature plate 20 engages shoulder 28 of base 12 and fixed thereto. Armature plate 20 has a tapered thickness that decreases as the radius increases.

The base 67 of the core of the coil assembly 18 and the armature plate 20 are preferably tapered so that the magnetic flux density is maintained relatively constant.

Clutch plate 22 has a central hub 78 having a double-D type hole for complementarily fitting on shaft 16 for a driving engagement. Clutch plate 22 has a circumferentially extending recess 80. Clutch plate 22 has a series of teeth 81 extending about the periphery thereof.

Input gear 24 has an inner hub 82, an outer hub 84 and a web 86. Inner hub 82 has a central bore allowing the input gear 24 to be slidingly mounted on shaft 16. Input gear 24 slides axially between an engaed position and a disengaged position and is able to rotate relative to the shaft 16 when in the disengaged position. The outer surface of inner hub 82 is tapered to complementarily fit with tapered bore 76 of armature plate 20. The outer hub 84 is sized to nestingly receive clutch plate 22. Web 86 has a ring of teeth 90 that is positioned to engage with teeth 81 of clutch plate 22.

Springs 88 and 89 are fitted within recess 80 of clutch plate 22 and acts against the web 86 of input gear 24. Spring 88 and 89 biases input gear 24 axially away from and out of engagement with clutch plate 22 to the disengaged position.

Preferably, spring 88 is a wave-type spring and spring 89 is a coil type. Spring 89 has a smaller diameter than spring 88. Spring 88 has an axial thickness of less than the disengaged gap distance between the coil assembly 18 and the armature plate 20. Preferably, the disengaged gap distance is about 1.1 mm. In this manner, spring 88 does not act when the input gear 24 is in a free wheeling condition and not engaging the clutch plate 22. Spring 89 is a relatively weaker spring than spring 88.

Figure 2:
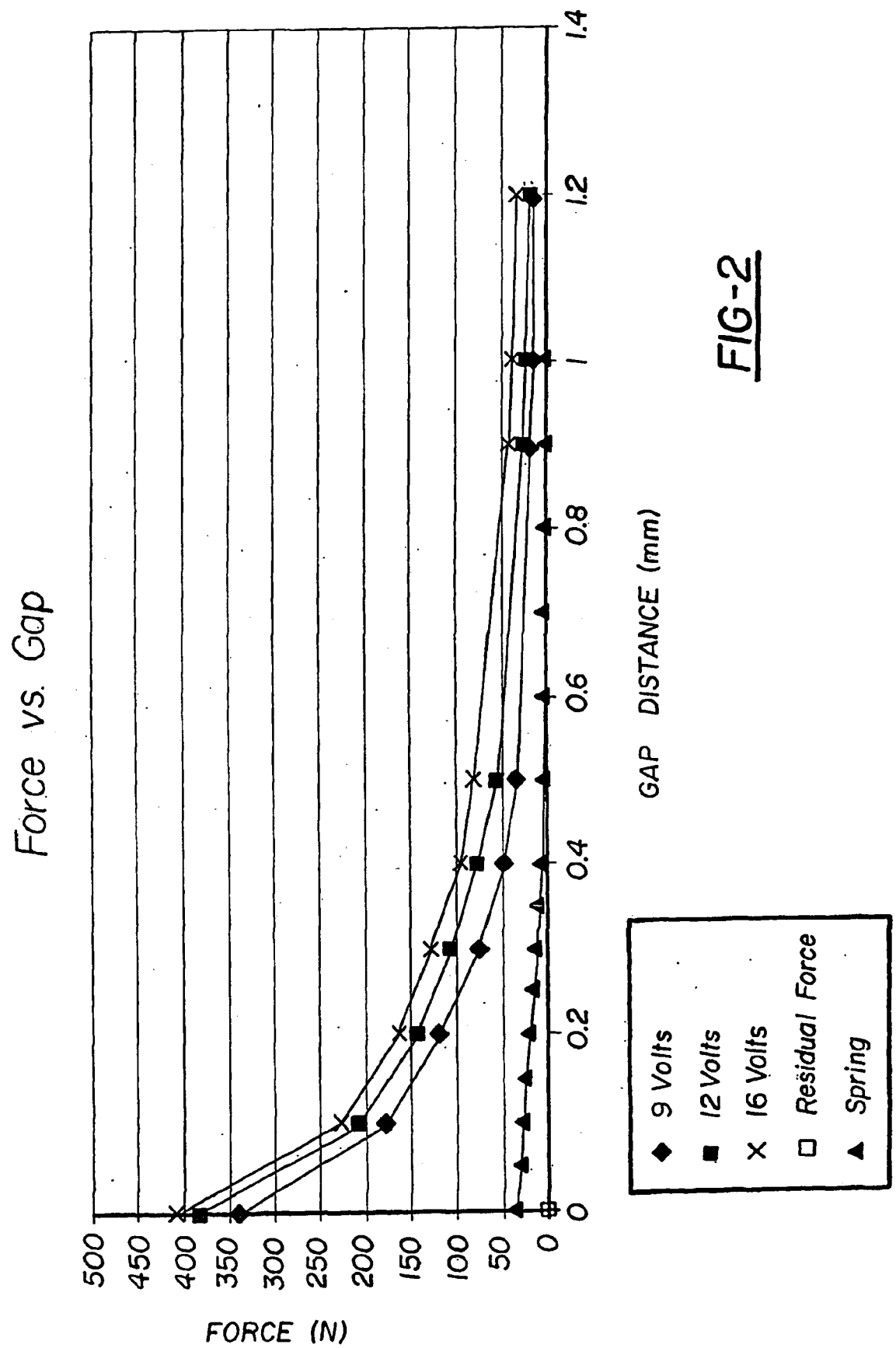
FIG. 2 is a graphical illustration of the relationship between spring force, magnetic force and gap distance.

Referring to FIG. 2, the combined forces generated by the springs 88 and 89 provide a relatively strong separation force when the gap distance is small, i.e. in the engaged distance. The separation force of the springs 88, 89 diminishes as the gap distance increases from the engaged distance to the disengaged distance. The spring forces of spring 88 and 89 must always be less than the attractive forces generated by coil assembly 18 but must be greater than the hysterisis of the coil assembly 18 once the coil assembly has been de-energized. The combined spring forces must overcome the hysteresis to separate the coil assembly 18 from the armature plate 20 and thereby disengage the input gear 24 from the clutch plate 22.

In the preferred embodiment, two springs 88, 89 have been shown. However, it is possible to replace the springs 88, 89 with a single variable rate spring.

Preferably, all of the internal components of the clutch assembly 10 may be manufactured from low carbon steel rather than sintered iron as is common in the prior art. The nature of the design of the present invention enables the use of low carbon steel or high performance magnetic sintered metal having relatively low mechanical properties. Prior art devices will generally compromise between magnetic and mechanical properties.

Optionally, the teeth 81 and 90 may be manufactured from a reinforced NYLON material having a tooth geometry of up to 27° as compared with 22.5° as is common in the prior art. The increased tooth angle improves disengagement of the teeth 81, 90 when under load.

Bronze may be utilized as a bearing material, and the bearing diameter can be reduced as compared with prior art devices. The result of being able to use bronze and smaller bearing diameters is that the clutch assembly 10 will have reduced torque losses due to friction.

After energizing the coil assembly 18, set screw 48 is rotated to move the clutch plate 22 along the shaft 16, until the clutch plate 22 meshes with the input gear 24. In this manner, full engagement between teeth 81, 90 can be assured.

In operation, the coil of coil assembly 18 is energized creating a magnetic flux field. The magnetic flux will extend through to the armature plate 20, in particular through to the inner and outer flanges 72, 74. The magnetic flux is sufficient to move the coil assembly 18 to abut the armature plate 20 in a metal to metal contact. The axial movement of the coil assembly 18 pushes against the inner hub 82 of the input gear 24, moving the input gear 24 from the disengaged position to the engaged position. In the engaged position, input gear 24 engages the clutch plate 22 for coupled movement therewith. The magnetic forces generated by the coil assembly 18 is sufficient to overcome the bias of springs 88 and 89 so that the opposing teeth 81 and 90 engage to couple the input gear 24 with the clutch plate 22. Upon de-energizing the coil of coil assembly 18, the bias of springs 88 and 89 urges the input gear 24 away from the clutch plate 22, from the engaged to the disengaged positions, de-coupling the armature plate 20 and clutch plate 22.

The above-described embodiment of the invention is intended to be an example of the present invention and alterations and modifications may be effected thereto, by those of skill in the art, without departing from the scope of the invention.

What is claimed:

1. An electromagnetic clutch assembly comprising:
   a housing,
   a shaft rotatably supported by the housing and having at least one end extending out of the housing,
   a clutch plate mounted on said shaft for rotation therewith,
   an armature plate mounted in said housing,
   a gear rotatable and slidably mounted on said shaft, said gear slides between an engaged and disengaged position, said gear in coupled engagement with said clutch plate when in said engaged position,
   a spring assembly extending between said clutch plate and said gear, said spring assembly biasing said gear to said disengaged position, out of engagement with said clutch plate, and
   a coil assembly,
   characterized by said armature plate having an inner flange and an outer flange, and said coil assembly being mounted on said shaft for sliding movement therealong towards and away from said armature plate between said flanges, said coil assembly engaging said gear, whereby energizing said coil assembly, said coil assembly moves into engagement with said armature plate and responsively effects movement of said gear into said engaged position, coupling said gear and said clutch plate, and de-energizing said coil assembly responsively enables said spring assembly to effect movement of said gear to said disengaged position, de-coupling said gear from said clutch plate.

2. An electromagnetic clutch assembly as claimed in claim 1, wherein said armature assembly has an aperture and said gear extends through said aperture and engages said coil assembly.

3. An electromagnetic clutch assembly as claimed in claim 2, wherein said armature plate has a flange configured to increase a pull force between said coil assembly and said armature plate.

4. An electromagnetic clutch assembly as claimed in claim 2 wherein each of said inner and outer flanges is spaced from an inner and outer periphery, respectively, of said coil assembly by a gap.

5. An electromagnetic clutch assembly as claimed in claim 4 wherein said gap is in a range of 0.05 to 0.2 mm.

6. An electromagnetic clutch assembly as claimed in claim 5 wherein said armature and said coil assembly are tapered maintaining a relatively constant magnetic flux density therein.

7. An electromagnetic clutch assembly as claimed in claim 1 or 6 wherein said housing has an axially extending set screw operatively engaging said clutch plate.

8. An electromagnetic clutch assembly as claimed in claim 7 wherein advancement of the set screw moves the clutch plate towards said armature plate.

9. An electromagnetic clutch assembly as claimed in claim 8 wherein said set screw is advanced until the clutch plate is spaced from said armature plate by a disengaged gap of about 1.1 mm.

10. An electromagnetic clutch assembly as claimed in claim 9 wherein said spring assembly generates:
   a relatively strong force urging said input gear away from said clutch plate when the gear is in or near the engaged position, and
   a relatively weak force when the gear is in the disengaged position.

11. An electromagnetic clutch assembly as claimed in claim 10, wherein said spring assembly comprises a wave spring and a coil spring.

12. An electromagnetic clutch assembly as claimed in claim 11, wherein said clutch plate has a set of teeth and said gear has a set of teeth complementary with said set of teeth of said clutch plate.

13. An electromagnetic clutch assembly as claimed in claim 12 wherein said sets of teeth has a tooth geometry of up to 27°.

14. An electromagnetic clutch assembly as claimed in claim 13, wherein said coil assembly is restrained to move axially along said shaft.

* * * * *